United States Patent [19]

McGrew

[11] Patent Number: 4,758,296

[45] Date of Patent: Jul. 19, 1988

[54] METHOD OF FABRICATING SURFACE RELIEF HOLOGRAMS

[76] Inventor: Stephen P. McGrew, 12615 Boulder St., Boulder Creek, Calif. 95006

[21] Appl. No.: 505,888

[22] Filed: Jun. 20, 1983

[51] Int. Cl.$^4$ ............................................. B29D 17/00
[52] U.S. Cl. ................................... 156/231; 156/275.5; 264/1.3; 264/226; 430/1
[58] Field of Search ............................ 156/230–232, 156/234–235, 237–239, 240, 249, 244.17, 246, 247, 272.2, 275.5, 275.7; 430/1, 2, 258, 259, 253, 260, 321; 264/1.3, 1.4, 226, 283, 293, 22, 227, 2.1–2.4; 350/3.6, 3.65, 3.69, 3.66, 162.11, 162.17, 3.76; 425/373, 115; 427/147, 146

[56] References Cited

U.S. PATENT DOCUMENTS

| | | | |
|---|---|---|---|
| 2,274,706 | 3/1942 | Keim | 156/235 |
| 3,293,331 | 12/1966 | Doherty | 264/1.3 |
| 3,459,839 | 8/1969 | Hutfles | 264/1.3 |
| 3,565,978 | 2/1971 | Folger et al. | 264/1.3 X |
| 3,627,529 | 12/1971 | Frank et al. | 430/253 X |
| 3,658,526 | 4/1972 | Haugh | 96/27 |
| 3,667,946 | 6/1972 | Sturdevant | 430/1 |
| 3,669,673 | 6/1972 | Chung Sen Ih | 430/321 X |
| 3,689,346 | 9/1972 | Rowland | 156/245 |
| 3,758,649 | 9/1973 | Frattarola | 264/1.3 |
| 3,917,378 | 11/1975 | Gale | 350/3.5 |
| 4,084,032 | 4/1978 | Pasersky | 428/172 |
| 4,388,137 | 6/1983 | McCarty et al. | 156/275.5 |
| 4,482,511 | 11/1984 | Komatsubara | 264/1.3 X |
| 4,582,885 | 4/1986 | Barber | 264/22 X |

FOREIGN PATENT DOCUMENTS

| | | | |
|---|---|---|---|
| 283591 | 8/1967 | Australia | 264/1.3 |
| 58-35578 | 3/1983 | Japan | 430/1 |
| 58-35579 | 3/1983 | Japan | 430/1 |

OTHER PUBLICATIONS

Kirk-Othmer, *Encyclopedia of Chemical Technology*, (1981 ed.), vol. 13, pp. 370, 373, Wiley & Sons, New York.
Kirk-Othmer, *Encyclopedia of Chemical Technology*, (1982 ed.), vol. 20, pp. 950, Wiley & Sons, New York.
Encyc. of Polymer Science, "Resin", vol. 12, John Wiley Publ., 1970, p. 66.

Primary Examiner—Michael Ball
Assistant Examiner—Ramon R. Hoch
Attorney, Agent, or Firm—Seed and Berry

[57] ABSTRACT

A method of manufacturing surface relief holograms wherein an original surface relief hologram in the form of an endless loop or a drum is continuously coated with a radiation-curable resin. After curing, the resin bears a replica of the original hologram and it is continuously drawn off from the original as a sheet or film. The replica film becomes a hot-stamping foil when formed in contact with a carrier film, metallized, and coated with a hot-stamping adhesive.

12 Claims, 1 Drawing Sheet

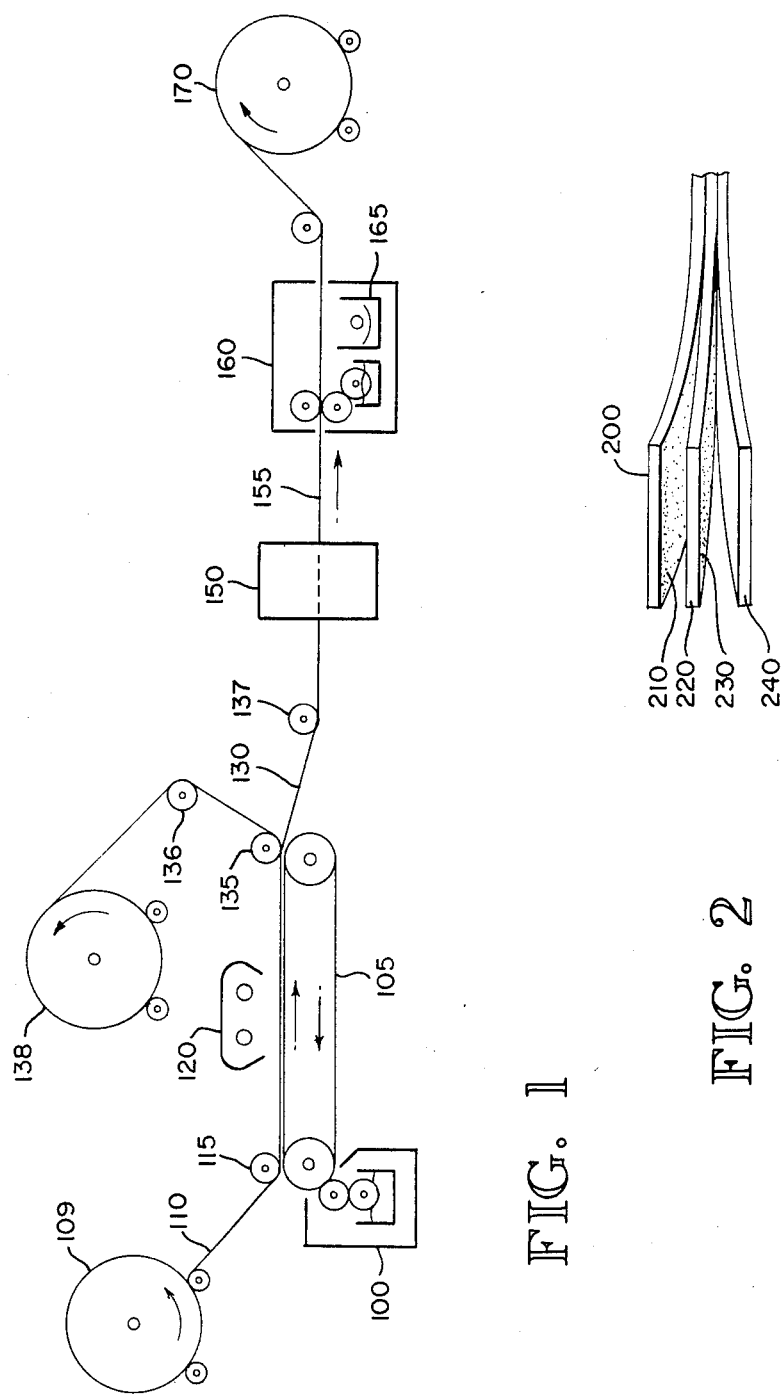

METHOD OF FABRICATING SURFACE RELIEF HOLOGRAMS

DESCRIPTION

1. Technical Field

The invention relates to holography, decorative use of optical defraction, printing, and hot-stamping foil. More particularly, the invention is directed to a method of manufacturing surface relief holograms and of creating a hot-stamping foil which may be used to apply holograms and other diffractive patterns to surfaces to provide decorative effects involving spectral colors and the illusion of texture, depth, and motion.

2. Background Art

Surface relief holograms have been made in the past by several methods. It is standard practice to record an original hologram in a relief medium such as photoresist or hardened gelatin. It is also standard practice to replicate surface relief holograms by preparing a durable master in the form of a nickel electroform as an embossing die for thermally embossing the original hologram into PVC or other thermoformable plastics. Solvent casting has been demonstrated wherein a clear plastic dissolved in a solvent is coated onto a master hologram and allowed to dry by evaporation, and the resulting dry layer of plastic is peeled off the master.

Hot-foil stamping is a well-established printing technique and a well-established method of transferring preprinted images to a substrate. A holographic hot-stamping foil was demonstrated in 1982, without disclosure of its method of manufacture. The foil was used to transfer premade holographic images onto a plastic substrate.

DISCLOSURE OF INVENTION

In the present invention, a master surface relief hologram in the form of a drum or a belt is coated with radiation-curable resin. The resin is cured in contact with the master and peeled off, thus forming a high-fidelity replica of the original surface relief hologram.

A further embodiment of the invention is a hot-stamping foil which may be used to transfer holograms onto plastic, metal, and paper surfaces, and the like. A hot-stamping foil is made by laminating a surface relief hologram master to a polyester film carrier with clear radiation-curable resin and peeling the master away, leaving the cured resin adhered to the carrier. Subsequently, the relief surface of the resin is metallized to enhance its reflectivity, and a standard hot-foil adhesive is applied to the metallized surface. The hot-stamping foil thus formed may be used with standard hot-stamping equipment wherein a heated die presses the foil against a surface such as paper and the heat and pressure cause a pigment or a metal film to be transferred to the paper from the hot-stamping foil. In the case of holographic hot-stamping foil, the resin hologram itself is transferred to the paper or other surface from the hot-stamping foil.

An object of the invention is to provide methods for making holographic hot-stamping foils.

Another object of this invention is to provide hot-stamping foils for applying diffractive or holographic decorative effects to surfaces.

Another object of this invention is to provide hot-stamping foils for applying diffractive or holographic anticounterfeiting features to credit cards, identification cards, passports, secure documents, certificates, and the like.

Another object of the invention is to provide a hot-stamping foil usable in standard foil-stamping equipment to produce graphical compositions incorporating diffractive colors and textures.

Other objects of the invention will, in part, be obvious and will, in part, appear hereafter.

FIG. 1 is a schematic of a system for manufacturing surface relief holograms by continuous casting of ultraviolet radiation-curable resin onto a holographic master mold in the form of a drum.

FIG. 2 is a cross-sectional view of a typical holographic hot-stamping foil.

BEST MODE FOR CARRYING OUT THE INVENTION

A first step involves producing an original surface relief hologram by well-known means. To produce the original hologram, an object is first recorded in a first hologram by standard off-axis recording techniques. A Benton hologram is then recorded from the first hologram onto a surface relief medium such as photoresist, thus producing the original surface relief hologram.

A second step involves making a hologram master. From the original surface relief hologram, a hologram master may be made by any of various techniques. One well-known way is to electroform nickel onto the original surface relief hologram, thereby producing a reversed metal replica of the original. Another way is to make a reversed metal replica of the original by the same method, but further, to use the metal replica in a heated press to emboss the relief hologram pattern into plastic. Another way is to use the original surface relief hologram or a replica thereof as a mold to cast a clear silicone rubber (or other radiation-transmitting material) replica of the original.

Yet another way to make a hologram master is to record the original hologram in a durable surface relief medium such as hardened gelatin. For example, the original hologram may be recorded in a standard silver halide/gelatin holographic medium. A hardening developer or hardening bleach may be used to process the hologram so that the interference pattern is recorded in the form of regions of varying hardness in the gelatin. Relief development is accomplished by soaking the hologram in warm water to dissolve the softer portions; then the gelatin is rehardened using a nonselective hardener to increase its durability.

In order to make a master in the form of a belt or drum, a number of individual masters, made as described above, may be joined at the edges to form a cylindrical surface which may be used directly as a belt or which may be attached to the surface of a drum, relief side out. For example, electroformed metal masters may be welded together or plastic masters may be ultrasonically butt-welded. Alternatively, a number of small masters may be adhered to the surface of a drum, relief side out.

In a third step, a hologram master made by one of the above methods is used as a mold for casting further replicas in radiation-curable resin. The resin is coated onto the relief surface of the master and irradiated with the type of radiation that cures it (ultraviolet or electron beam); then the cured resin is separated from the master as a sheet. The relief surface is replicated thereby in the cured resin.

Three basic forms of hologram replicas may be made in the third step. The first form is a self-supporting resin film. The second form is a resin film supported by a substrate. The third form is a transfer film initially supported by a substrate.

In all of the forms, it is preferable to produce a hologram in transparent resin with a smooth back surface (non-relief surface) so that the hologram can be viewed clearly through the back surface. Thus, in all three of the described forms, it is advantageous to cure the resin between the hologram master and a smooth material, such as polyester film, as if the resin were being used to laminate the master to the film. In the first form, the smooth material is separated from the resin after the resin is cured. In the second form, the smooth material acts as the substrate and should be smooth on both surfaces. A variation on the second form is a resin replica film adhered to an opaque substrate, such as paper, instead of to a smooth material. In the third form, the smooth material serves as the carrier of the transfer film and separates from the resin in a later step.

In a fourth step, the relief surface of the cured resin is coated with a substance to increase its reflectivity. The substance may be, for example, vacuum-coated aluminum or a substance with a high refractive index, such as tin oxide. The fourth step completes the basic manufacturing stage of the first two forms. The transfer film form typically requires further that a suitable adhesive be coated onto the aluminized surface of the resin so that a transfer film may be adhered to another surface by pressure or a combination of heat and pressure. The precise choice of adhesive is dependent on the nature of the surface to which the transfer film will ultimately be adhered.

FIG. 1 is a schematic of one embodiment of a system for manufacturing hologram in any of the three discussed forms. Radiation-curable resin is coated by a conventional roller coater 100 onto a hologram master 105 in the form of a belt. A smooth polyester film 110, such as Mylar, is unrolled from reel 109 and applied to the uncured resin-coated hologram master by roller 115. the belt 105 with its resin coating and polyester covering 110 moves under a radiation source 120, which may be an ultraviolet source or an electron beam source. The radiation from the source 120 cures the resin. The belt 105 carries the cured resin 130 and the polyester covering 110 to a position where a peel-off roller 135 and further rollers 136 and 137 are used to separate the belt 105, the cured resin 130, and the polyester covering 110. For a self-supporting cured resin film, a relatively great film thickness of two to ten mils is desirable. Alternatively, rollers 136 and 138 might be eliminated in order to leave the cured resin attached to the polyester covering, and the polyester covering might be treated to adhere tightly to the resin. In order to make a transfer film (i.e., a hot-stamping foil), rollers 136 and 138 might be eliminated and the polyester covering might be treated for moderate adhesion to the cured resin so that the cured resin will remain attached until it is later adhered to another surface.

Vacuum coating can be done in-line by a conventional coating station 150, or in batches by conventional techniques involving vapor deposition of aluminum or other materials.

Finally, if hot-stamping foil is being made, a conventional roll coater 160 with an infrared dryer 165 applies a coating of adhesive to assure firm adhesion between the resin film and the surface to which the film will ultimately be transferred.

While the system described in FIG. 1 is designed for production of hologram replicas in a continuous sheet, it is within the scope of the present invention to form the holograms individually. For example, a relief printing device may be constructed wherein radiation-curable resin is applied to a rigid transparent master, and paper is then placed in contact with the resin. Radiation cures the resin through the master; and when the master is lifted off, the cured resin stays attached to the paper.

It is important, of course, that the cured resin not adhere strongly to the master. Ultraviolet-curable resins release easily from untreated polyester film, from metals, and from silicone rubber. Standard surface treatments are known in the hot-stamping industry wihch control the adhesion between cured resin and various types of plastics.

A suitable resin for ultraviolet curing is Cellofilm C-200, which is most commonly used as an adhesive for laminating purposes. It cures quickly in the absence of oxygen to a colorless transparent film. In the cured state, it is brittle and has a high melting point, which are desirable characteristics in a hot-stamping film. Other standard formulations may be chosen for abrasion resistance, color, flexibility, or other useful properties.

Holographic hot-stamping foil has particular advantages for use in security printing because it is easy to apply smoothly to a plastic card and cannot be removed without damage once applied. Holograms are difficult to counterfeit because of the complexity of the interference patterns composing them and because of the microscopic accuracy of the imagery which can be recorded in them. Holographic hot-stamping foil also has advantages for use in decorative printing because it offers colors, textures, and illusions of depth that are not possible to obtain by other means and because it can be used with standard hot-foil stamping equipment.

Diffractive compositions such as are described in a copending patent application, "Diffractive Color and Texture Effects for the Graphic Arts," comprise a particularly valuable use for holographic hot-stamping foils. For example, the product whose trade name is "SPECTRAFOIL" is a quasirandom diffraction pattern which appears to be a single spectral color when viewed from a given position. Multicolored diffractive images can be composed from segments of "SPECTRAFOIL," with regions of different color being formed by "SPECTRAFOIL" of different average spatial frequency. Hot-stamping foils bearing different versions of the "SPECTRAFOIL" pattern can thus be used to compose multicolored images by accurately registered hot stamping with dies corresponding to color separation components of the image.

A holographic relief pattern can be applied directly to paper by substituting paper for the polyester covering 110 in FIG. 1. In that case, the paper becomes the substrate which supports the hologram. The hologram is viewed from the relief side, which is aluminized to enhance brightness. In order to protect the relief surface, a transparent protective coating may be applied to the hologram. The transparent coating itself may be a standard radiation-curable overcoat resin. It is preferable that the outer surface of the overcoat be smooth, which may be assured by curing the overcoat between the holographic relief surface and a smooth covering film.

For curing by ultraviolet radiation, it is necessary that either the hologram master or the covering film be capable of transmitting ultraviolet light. A polyester or silicone rubber master or covering transmits sufficient ultraviolet light. Electron beam curing is a standard process in the printing and laminating industries. Because, as is well known, electron beam curing can be done through materials opaque to light, thee are possible advantages to using electron beam curing in such cases as applying the relief pattern directly to paper.

In certain cases, it may be desirable to apply a second relief pattern to the surface of the resin film opposite the holographic relief surface. This is accomplished by making the covering film 110 in FIG. 1 as a relief master comparable to the hologram master 105. For example, Benton holograms can be made achromatic by molding a vertical one-way diffuser into the second surface. For full-color holograms, it is useful to form a relief hologram on one surface and color-selective means on the opposite surface. The color-selective means can be an "off-axis zero order diffraction grating," which is itself a holographic surface relief pattern.

FIG. 2 is a cross-sectional view of a typical holographic hot-stamping foil. A carrier 200 of thin polyester film with a release layer 210 is the substrate for a radiation-cured resin hologram 220. The hologram 220 is vacuum-coated with aluminum 230, and the aluminun 230 is coated with a hot-stamping adhesive 240. The holographic hot-stamping foil is used by pressing the foil against a receiving surface using a heated die so that the adhesive 240 adheres to the receiving surfce and the resin hologram 220 is thereby more strongly adhered to the receiving surface than to the carrier 200. A brittle material, such as Cellofilm C-200, is desirable in the manufacture of holographic hot-stamping foil because the transferred material separates cleanly at the edges from the untransferred material remaining on the carrier.

While the methods disclosed herein are primarily directed toward replication of diffractive surface relief patterns, it is clear that the methods are also useful for replication of any kind of surface relief pattern. Radiation-curable resins can be formulated so that they do not shrink during curing, which makes them especially well suited for replicating relief patterns which require high fidelity, such as corner reflector retroreflective array tapes usefuil as roadway reflectors.

In the claims which follow, the words "hologram" and "diffractive pattern" are used to mean any diffractive pattern, including laser-viewable holograms, Benton holograms, diffractive graphical effects, multiplexed holograms, ruled diffraction gratings, and diffractive mosaic patterns.

I claim:

1. A method of forming resin replicas of a surface relief structure, comprising:
   providing a durable surface relief hologram master of said structure;
   coating said master with a radiation-curable resin;
   curing said resin in contact with said master by exposing said resin to radiation; and
   removing said resin in a cured state from said master.

2. The method of claim 1 wherein said master is in the form of a belt and said coating, curing, and removing are done continuously.

3. The method of claim 1 wherein said master is in the form of a cylinder and said coating, curing, and removing are done continuously.

4. The method of claim 1, further including the step of coating the relief side of said resin replica with a reflectance-enhancing substance.

5. A method of forming resin replicas of surface relief structures, comprising;
   providing a durable surface relief hologram master of said structures;
   forming a laminate of said master and an opaque material with radiation-curable resin therebetween;
   curing said resin in said laminate by exposing said resin to radiation; and
   separating said cured resin and said opaque material from said master.

6. The method of claim 5 wherein said master is in the form of a belt and said coating, curing, and removing are done continuously.

7. The method of claim 5 wherein said master is in the form of a cylinder and said coating, curing, and removing are done continuously.

8. The method of claim 5, further including the step of coating the relief side of said resin replica with a reflectance-enhancing substance.

9. A method of making a hot-stamping foil, comprising:
   providing a durable surface relief hologram master;
   forming a laminate of said master and a smooth carrier film with a radiation-curable resin therebetween;
   curing said resin in said laminate to form a replica of said master;
   separating said cured resin and said smooth material from said master; and
   coating the relief surface of said replica with a hot-stamping adhesive.

10. The method of claim 9 wherein said master is in the form of a belt and said coating, curing, and removing are done continuously.

11. The method of claim 9 wherein said master is in the form of a cylinder and said coating, curing, and removing are done continuously.

12. The method of claim 9, further including the step of coating the relief side of said resin replica with a reflectance-enhancing substance.

* * * * *